United States Patent [19]

Bloomstein

[11] Patent Number: 4,827,532

[45] Date of Patent: * May 2, 1989

[54] CINEMATIC WORKS WITH ALTERED FACIAL DISPLAYS

[76] Inventor: Richard W. Bloomstein, 1443 Cavell, Highland Park, Ill. 60035

[*] Notice: The portion of the term of this patent subsequent to Jul. 15, 2003 has been disclaimed.

[21] Appl. No.: 841,580

[22] Filed: Mar. 20, 1986

Related U.S. Application Data

[62] Division of Ser. No. 717,843, Mar. 29, 1985, Pat. No. 4,600,281.

[51] Int. Cl.⁴ .............................................. G06K 9/36
[52] U.S. Cl. .................................. 382/41; 340/725; 352/50; 352/87
[58] Field of Search ............................ 352/41, 50–52, 352/54, 87; 340/725; 358/183; 364/518, 522

[56] References Cited

U.S. PATENT DOCUMENTS

| | | | |
|---|---|---|---|
| 3,510,210 | 5/1970 | Haney | 352/50 |
| 3,662,374 | 5/1972 | Harrison et al. | 340/725 |
| 3,747,087 | 7/1973 | Harrison et al. | 352/52 |
| 4,178,613 | 12/1979 | Takahashi et al. | 358/183 |
| 4,260,229 | 4/1981 | Bloomstein | 352/50 |
| 4,297,724 | 10/1981 | Masuda et al. | 358/183 |
| 4,600,281 | 7/1986 | Bloomstein | 352/50 |
| 4,602,286 | 7/1986 | Kellar et al. | 358/183 |
| 4,642,710 | 2/1987 | Martha et al. | 340/725 |

Primary Examiner—Leo H. Boudreau
Assistant Examiner—Joseph Mancuso
Attorney, Agent, or Firm—Caliste J. Alster

[57] ABSTRACT

The invention relates to a cinematic work and includes substituting for an original sound track of a motion picture a new sound track in a different language while at the same time correcting the lip movements of actors in the film to correspond to the new language. The method makes use of selected equipment, such as a digital video image processor, a video display, a programmed digital computer, and selected data on a frame-by-frame basis as to mouth location, mouth shape, mouth movements, etc. of the actor on the film and the frame-by-frame photographed mouth area of the new actor supplying the new language sound. The computer cooperates with the image processor to effect the alteration in the lip shapes by varying the intensities of the video pixels in the facial area on the film in accordance with the data and the program in the computer, whereby the new sound track with correct lip movements may be substituted for the original sound track.

3 Claims, 5 Drawing Sheets

FIG. 5
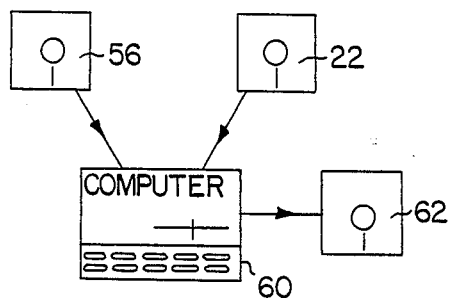
FIG. 6A
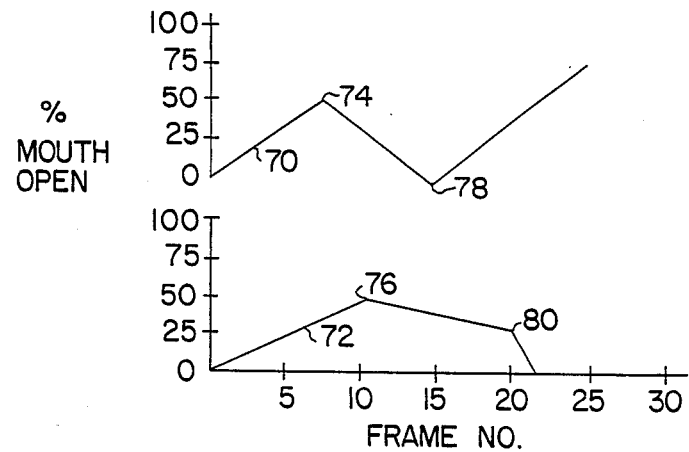
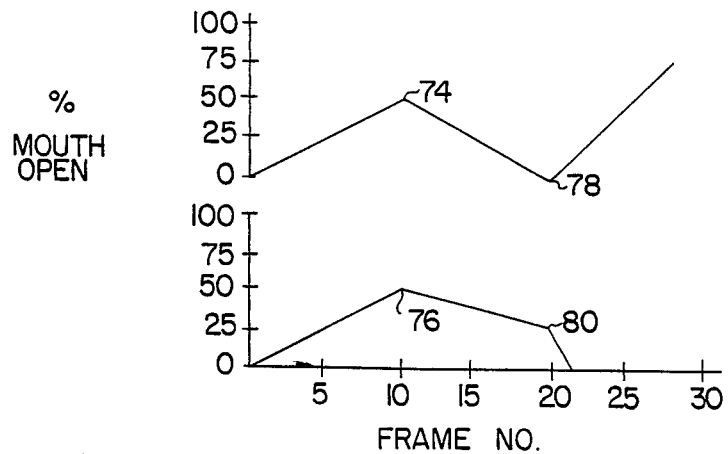
FIG. 6B

4,827,532

CINEMATIC WORKS WITH ALTERED FACIAL DISPLAYS

CROSS REFERENCE TO RELATED CASE

This application is a division of my co-pending application Ser. No. 717,843 filed Mar. 29, 1985 U.S. Pat. No. 4,600,281.

BACKGROUND OF THE INVENTION

This invention relates generally to cinematic works, and more particularly to an altered cinematic work in which a second animated facial display replaces a first or presently existing animated facial display in the work, and in which the displays have lip movements corresponding to the languages used by the actors and wherein the languages of the two displays are sufficiently different to result in different lip and/or other facial movements for each display.

The present invention is intended to avoid the simple "dubbed in" effect wherein the lip movements do not agree with the dialogue. Thus, the invention is particularly applicable for replacing the sound track of a motion picture with a new sound track of a different language while also modifying the lip movements of the actors in the picture to correspond to the new language to be applied to the sound track. The invention is applicable to works using live actors as well as for animated cartoons.

In U.S. Pat. No. 4,260,229 granted Apr. 7, 1981, there is shown and described a system and method wherein predetermined visual images such as lip movements are graphically created to correspond with speech sounds so that when the visual images and speech sounds are recorded on film, video tape or other media the presentation to the listener or viewer will be that of lip movements corresponding to the language being used and for that reason will make the cinematic work more real and interesting.

In the system of the foregoing patent speech sounds are analyzed, digitally encoded and transmitted to a computer. Stored within the computer is a program for producing output data that creates visual images of lip movements corresponding to the speech sounds. Under control of the data for the speech sounds, the graphical output from the computer is sent to a graphic output device and related display equipment to produce the graphical display which may be combined with speech sounds so that resultant audio-visual display contains lip movements corresponding to the speech sounds.

OBJECTS AND SUMMARY OF THE INVENTION

Broadly speaking the present invention has for one of its objects an improved novel technique for correcting lip movements on frames of the film by a novel use of a programmed digital computer and selected data, whereby a new motion picture is produced having a new sound track with correct lip movements substituted for the original sound track where the original sound track is in a foreign language with different lip movements. Such a film avoids having a "dubbed in" appearance.

A further object of this invention is to provide a method and arrangement of the type stated in which it is not necessary to store phoneme codes nor is it necessary to provide elaborate drawings for mouth shapes, i.e., the mouth shapes are just several in number and are utilized in conjunction with unique algorithms to effect the changes in lip configurations corresponding to the new language applied to the cinematic work.

A further object of this invention is to provide a method and arrangement of the type stated which eliminates the need for a voice encoder to determine the lip shapes required by the sounds. In lieu thereof a recording is made by the actor whose voice and lip movements will be substituted for that on the existing cinematic work. The audio is recorded separately from the motion picture or video portion, and the latter is used to make a limited number of measurements graphically on a frame by frame basis. However, it is not necessary to make measurements on each frame, but generally only on those frames where there is a change in direction of the lips as determined by slow motion viewing of the frames. The measurements on intermediate frames is carried out in the computer utilizing a non-linear interpolation algorithm. These measurements make the relationship between the new sound and the original lip shape more direct.

Whenever possible an effort is made to select frames where the new sound and the original lip shapes match. Sometimes this means skipping and/or duplicating frames. However, this approach does not always produce acceptable looking movements and many frames have to be altered. For this purpose there are traced standard facial curves, including lip and jaw curves. Data for these standard curves are sent into the programmed digital computer, and this is done with respect to each actor. The standard curves may in particular include full open mouth, full closed mouth, normal width of mouth, and pursed. These standard curves become the basis for later interpolation of mouth, jaw and lip lines for each frame.

For example, if an actor's lower lip is twenty-five percent open its curve is approximated by the curve calculated by interpolation of each point twenty-five percent of the way between the standard closed position curve and the standard opened position curve for that actor. In this regard it has been found that the percentage open or closed for any particular actor is relatively constant over the width of the mouth, and this discovery tends to simplify the geometry and reduce the number of curves necessary to effect reasonably accurate correction of the lip configuration.

The frames are corrected by creating a new lip configuration through alteration within the computer. The computer is used in conjunction with an image processor, a known commercially available piece of equipment. Signals are transmitted to and from the computer and the image processor during the correction process. The image processor is capable for receiving the successive video frames in analog form and converting them to digital form for storage therein. Moreover, each frame may be retransmitted from the image processor to a standard video monitor where the frame appears as a still picture. The image processor may send the necessary video signal for the frame to the monitor sixty times a second, whereby the corrected video frames may be viewed or dealt with in the processing operation. The video screen is conventionally made up of pixels, and each pixel is scanned and digitized into an array of numbers corresponding to the light intensity of a number of points (for example 512×480 pixels or points) on the original scene. These numbers are stored into and displayed from a large but otherwise conventional digital computer memory. Each number is addressable by a unique location corresponding to the original point location. Moving the numbers from one set of memory locations to another set has the effect of moving a part of the frame from one area to another. Since the movement is done by computer, the movement can involve complex numerical algorithms corresponding to complex movements. This digital figure permits the actors lips to be "stretched" or "shrunk" directly on the displayed face. Furthermore, the computer algorithms calculate the individual moves for each point in the actors face depending on where the point lies between the standard curves and the degree or percent of alteration as determined by measurements from the new language lip movements and measurements of existing language lip movements.

After the pixels have been moved on the video displayed face of the actor based on the foregoing calculations, the computer program provides a fill in from previous frames. For example, the computer stores the representation of the teeth from the actors open mouth in part of the computer memory so as to enable the mouth to be filled when stretched open in later frames.

Furthermore, broadly speaking, the altered cinematic work embodies a substituted second animated facial display for a first animated facial display and in which the displays have lip movements corresponding to the languages used and wherein the languages of the two displays are sufficiently different to result in different lip movements for each display, and including: generating data in digital form representing the configuration of the second facial display over a plurality of cinematic frames, generating data in digital form representing the configuration of the first facial display over a plurality of cinematic frames of said work, and altering under the control of both sets of said data and a programmed digital computer the configuration of said first facial display to produce substantially the configuration of the second facial display.

Viewed another way the invention comprises substituting a second language and associated lip movements with a first language and associated lip movements in a cinematic work made up of a number of frames and wherein the two languages have different lip movements and including the steps of: generating data in digital form representing the lip movements of the respective languages, transmitting said data to a programmed digital computer, and under control of said computer, and in accordance with said data, modifying the light intensities at selected areas of the frame to alter the lip movements to a configuration corresponding to said second language.

BRIEF DESCRIPTION OF THE FIGURES

FIG. 5 is a further block diagram showing a step in the invention consisting of comparing data in digital form for the measurements taken in FIGS. 3 and 4;

FIGS. 6A and 6B are graphs constituting a display for use in selecting frames most suitable for use in the process of the invention;

DETAILED DESCRIPTION

Figure 1:
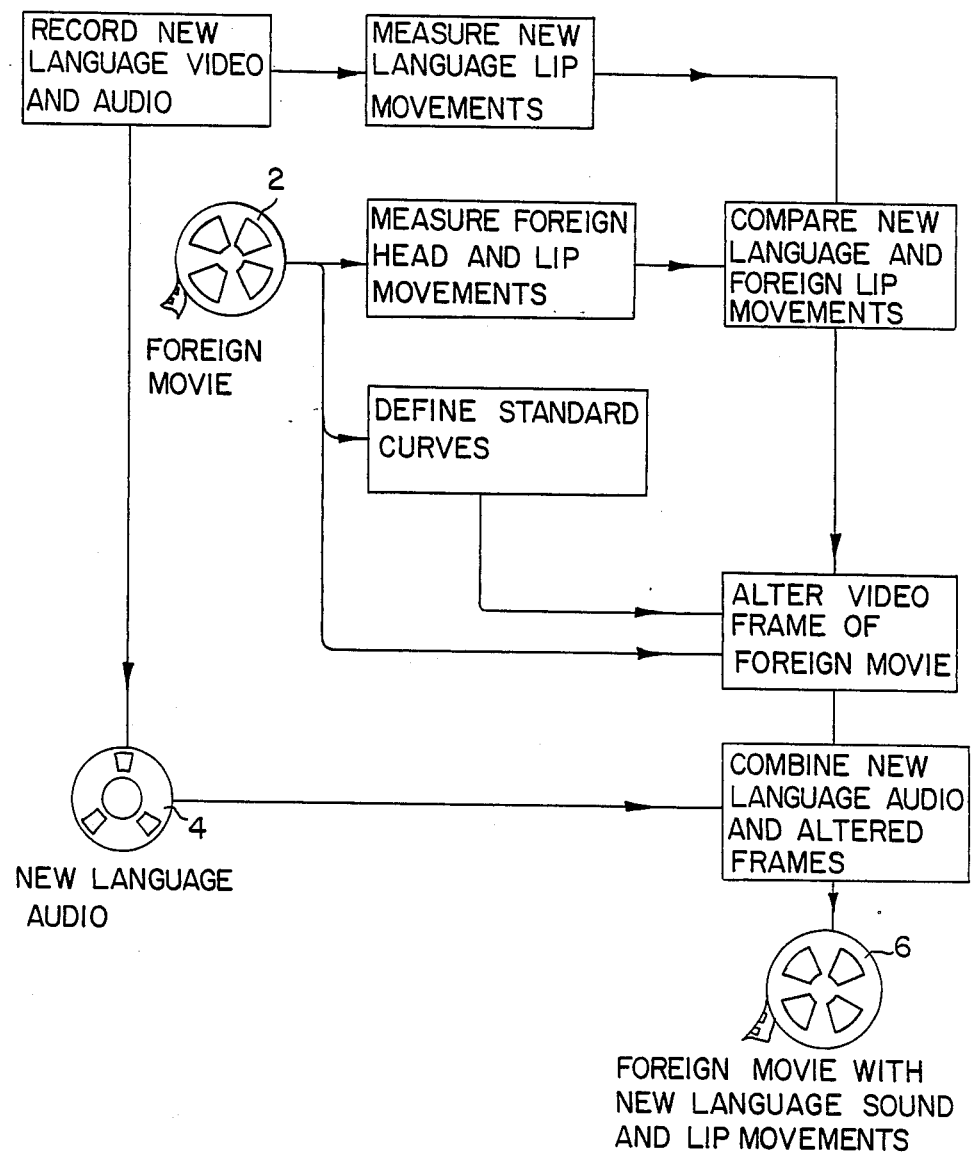
FIG. 1 is a block diagram graphically illustrating steps of an embodiment of the present invention.

Referring now in more detail to the drawings, and in particular to FIG. 1, there is shown a block diagram setting forth the basic functional steps in accordance with the disclosed embodiment of the invention. Thus, the block diagram shows an arrangement for substituting a second or new language dialog with accompanying facial animation including lip movements for a section of a motion picture 2 in a language foreign to that of the new language. The foreign language work may be in film form or in the form of a video tape. A new actor is utilized to speak (audio), and lip movements with the audio are to be substituted for that of an actor in the film. The actor with the new language records the new language on a recording medium 4 such a tape and at the same time the lip movements and configurations of that actor are video-taped, displayed and measured. This information is converted into digital form. Similarly, the head and lip movements of the actor in the film are measured together with head movements. This information is converted into digital form. The two groups of data are compared in a programmed computer to provide a measure of the amount of correction that must be made to the lip movements of the foreign film actor to bring those lip movements, along with facial movements, into positions which correspond to the new language sound of the new actor. Such data are stored in a computer in digital form. The data constituting measurements of the lip movements of the new actor and the original actor are on a frame by frame basis, but it will be understood that it is not necessary to utilize all frames of the foreign film, as will be presently more fully described. Furthermore, standard curves are derived from selected frames to serve as reference points for making the corrections in the lip and facial movements. All of the data are fed into a programmed digital computer, and by the use of unique algorithms, more fully described herein the frames of the foreign film are altered to provide the desired lip shapes corresponding to the new language. Thereafter, the new language audio is combined with the new language lip movements to provide a film or video tape 6 with a new sound track and revised lip movements properly matching the audio. In the process the frames of the foreign film are preferably converted into video form where the changes are effected by moving pixels to the extent necessary to correct the position of the lips and other facial configurations being revised. The altered frames may then be rephotographed or alternatively the foreign movie may be retained in video tape form.

Figure 2:
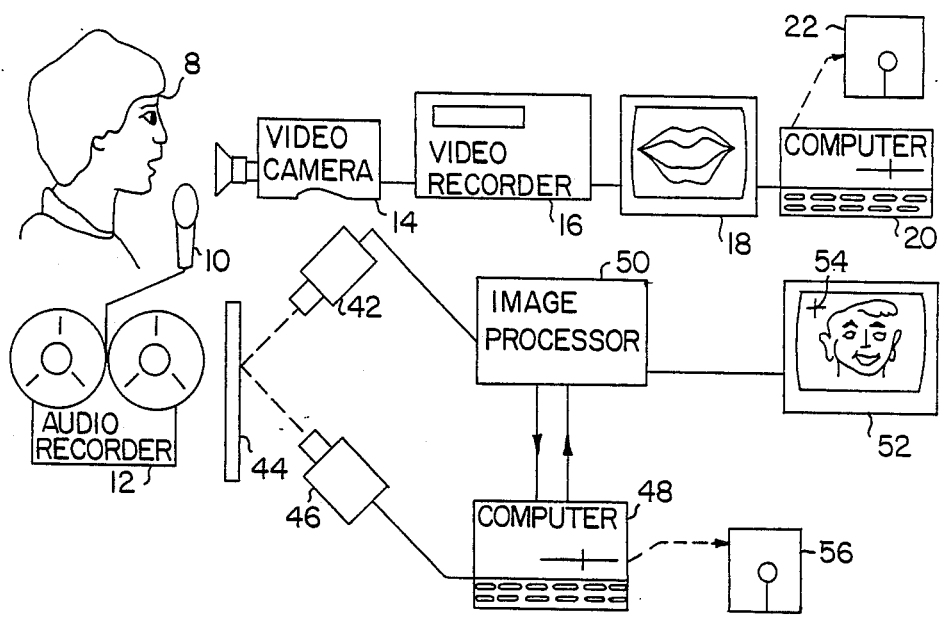
FIG. 2 is a further block diagram, principally showing hardware connections, of some of the initial steps in the process of this invention.

Referring now to FIG. 2 there is shown an actor 8 that speaks into a microphone 10 in the language to which the film is being converted. The actor's voice is recorded on an audio recorder 12, and simultaneously a video camera 14 photographs the lip movements of the actor 8. The video signals from the camera 14 are recorded on a video tape recorder 16 which when operated sends its output signals to a video monitor 18. The monitor 18 displays the video signals on a frame by frame basis or by selected frames may have measurements made thereon as will be presently more fully described. The measurement signals constituting video information are sent to a computer 20 for recording on a diskette 22.

Figure 3:
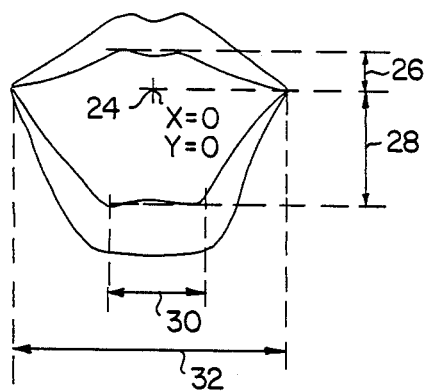
FIG. 3 is an enlarged illustration of the lip configuration of the second or new language which will be applied to the sound track, and showing the measurements being taken thereon.

It has been found that only a limited number of measurements need be taken on the new language lip movements, as shown in FIG. 3. Generally speaking the measurements taken are upper height 26, lower height 28, inner width 30 and outer width 32. While in theory at least all of the frames could be measured, in practice the measurements may be limited to selected frames at which the lip movements change, namely starting to open, stopping opening, starting to close and other abrupt changes in configuration.

In making the measurements the operator displays each frame to be measured on the monitor 18 and then measures the distances 26, 28, 30, 32 with a ruler.

The measurements may be converted to a unit lip size by comparing each measurement to the maximum for the actor 8 and restated as an absolute dimension, such as inches or centimeters, to a percent of the maximum. As will be seen hereafter this permits comparison of the lip movements presently existing on the audio-visual film so that movements of the lips on the film may also be restated to the same index. Furthermore, the center of the mouth (graphically X=0, Y=0) may be located as shown at 24 in FIG. 3. Moreover, the measurements can be converted from the screen coordinates X, Y, locations to percent open by measuring and comparing each movement to the maximum distance of the open mouth condition encountered for the actor 8, and for each other actor whose lips and voice will be processed.

The computer 20 may be a well-known type, for example an IBM PC Model AT and the various measurements referred to with reference to FIG. 3 can be typed into the computer by use of a standard keyboard associated therewith for recording of the data on the diskette 22.

The existing or "foreign" head and lip movements on the film are measured by the operator viewing the frames from the film or from the screen projection of a video tape. The head and lip movements will be compared to the sound movements previously described and will be used to control the alteration of the graphic frames, as will hereinafter be more fully described. Like the lip movements of the new language referred to previously, the existing lip movements are measured to include the same measurements as in FIG. 3, namely upper height, lower height, inner width, and outer width. In addition the head movement may be measured by the X, Y coordinates of the center of the mouth and change in head tilt. Like the new language movements measurements can be limited to frames in which movements change. While all frames may be treated, a practical application of the present invention utilizes only a small number of frames as compared to the total frames in the film.

As best seen in FIG. 2 there is a film projector 46 containing the cinematic work which projects an image onto a screen 44 on a frame by frame basis under control of a signal from a computer 48. The image on the screen 44 is picked up by a video camera 42 and transmitted to an image processor 50. The image processor redisplays the image onto a monitor 52 having a cursor 54. The monitor thus views the image on a frame by frame basis, each frame appearing as a "frozen" or still picture.

The image processor 50 is a known piece of equipment and which may be a Model 1633 made by Digital Graphic Systems, Mountainview, Calif. and is sold under the trademark CAT and is sometimes referred to as a CAT Model 1633 digital image processor. This image processor receives an analog signal from the video camera 42, converts the signal to digital form and stores the signal therein on a frame by frame basis. The signals from the imageprocessor are then retransmitted to a monitor 52 which receives the image of each frame sixty times per second at which provides a still or "frozen" frame for viewing and for corrective work. Thus, the image processor is capable, among other things, of digitizing a video signal, storing the signal as an array of light intensities (picture elements or "pixels") in digital memory, and displaying the light intensities on a television monitor, and superimposing a flashing cursor at any specified location of X and Y on a video monitor display.

The operator advances frames by operating the projector 46 through a signal from the computer 48 to display a frame onto the screen 44 for pick up by the video camera 42. In this regard it should be noted that in lieu of the camera 42 the cinematic work may be on a video tape in which case transmission to the image processor can be on a frame by frame basis from the videotape.

Figure 4:
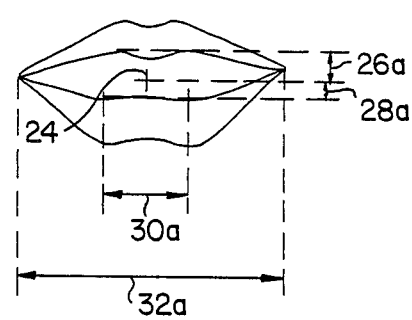
FIG. 4 is a view similar to FIG. 3 but showing the lip configuration associated with the original language on the cinematic work.

The operator, by the execution of commands to the computer, commands digitizing and display of a frame on the monitor 52. The operator then causes the cursor 54 to be displayed and moved to selected key points (hereinafter described) on the frame. The measurements can be simplified by devoting selected keys on the computer keyboard and for a special command key to be used to identify the data to be stored. Data constituting the lip movements for the "foreign" film is stored in a diskette 56 which receives its data from the computer 48. The measurements 26a, 28a, 30a, 32a of the original lip movements on the film can be converted from the screen coordinate X, Y locations to a percent opening by measuring and comparing each movement to the maximum distance encountered for the actor appearing in the film. FIG. 4 shows the measurements of lip configuration for the actor on the film at one frame thereof. The measurements from the various frames may be converted from the screen coordinate X, Y locations to percent open for the particular actor on the film. The cursor 54 may be used to make the various measurements in FIG. 4 upon command, in accordance with conventional techniques for operating computers.

FIGS. 5 and 6 illustrate graphically and diagrammatically a comparison or match up of the new language lip movements to those existing on the film. In this manner a frame of the existing work may be paired off with a suitable frame of the lip movements taken for the new actor 8 so as to reduce the amount of adjusting of the existing lips. As seen in FIG. 5 data relating to the lip movement of the original language and appearing on diskette 56 is sent into computer 60 along with data for the new or second language 22. Thus, the two groups of data on the diskette 22, 56 are introduced into the programmed computer 60 to produce a diskette 62 constituting data that cooperates with data for standard curves (hereafter described) to produce a display of lip movements corresponding to the second or new language.

The operator compares the number of frames made of the lips of the actor 8 as compared to the number of existing frames of foreign graphics. The operator compares the counts and calculates the adjustment necessary based on the circumstances. For example, if the second language sound will require 300 frames and the section of the film contains 400 frames the operator may decide to (1) drop the first 100 frames of the work, (2) drop the last 100 frames of the existing work, (3) drop 1 out of every 4 out of the existing work, etc. In close up scenes where correction is most important the operator may vary the adjustment based on both head and lip movements.

To aid in the selection or pairing off of frames the computer is programmed to plot out a graphic such as that shown in FIG. 6A. The plot is percent mouth open versus frame number, and it will be seen that graphs 70 and 72 may for example relate to relative percentage of mouth open of the actor 8 for the curve 70 and the same data on the curve 72 for the actor in the film. For purposes of cutting down the amount of corrections it may be desirable to shift the point 76 to coincide with the point 74 and shift the point 80 to correspond with the point 78. As the computer permits the graphs 70, 72 to be shifted relative to one another to vertically align point 74 with point 76 and point 78 with point 80, as shown in FIG. 6B, the operator can then select the frames to be paired for purposes of adjusting the lip movements on the file.

Before introducing the data relative to the lip movement measurements shown in FIGS. 3 and 4, the operator identifies and defines control points for standard curves to characterize the actor in the section of film being processed. While the new and original lip movement measurements will be used to control the amount of alteration of each frame the standard facial curves will control the location of the alterations. Only a small number of control points need be defined to characterize the actors face in the film for resynchronization to the new sound. For this purpose selection is made of a minimum of two frames for standardizing a section of the film. One frame shows the mouth fully open and the other frame shows the mouth fully closed. Additional frames may be selected if the head position warrants.

Figure 7:
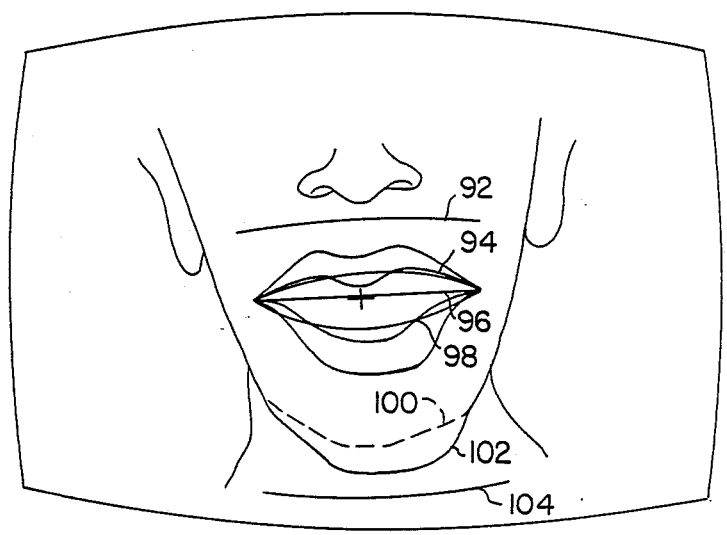
FIG. 7 is a video display of the face of the actor in the original language version of the work and showing the manner of forming standard curves, the use of which forms part of the present invention.

The standard curves shown in FIG. 7 include nose blend 2, open upper lip 94, centerline 96, open lower lip 98, closed jaw 100, open jaw 102 and neck blend 104. Two additional curves, closed upper lip and closed lower lip are not illustrated in FIG. 7 since they normally coincide with the centerline curve 96.

Figure 8:
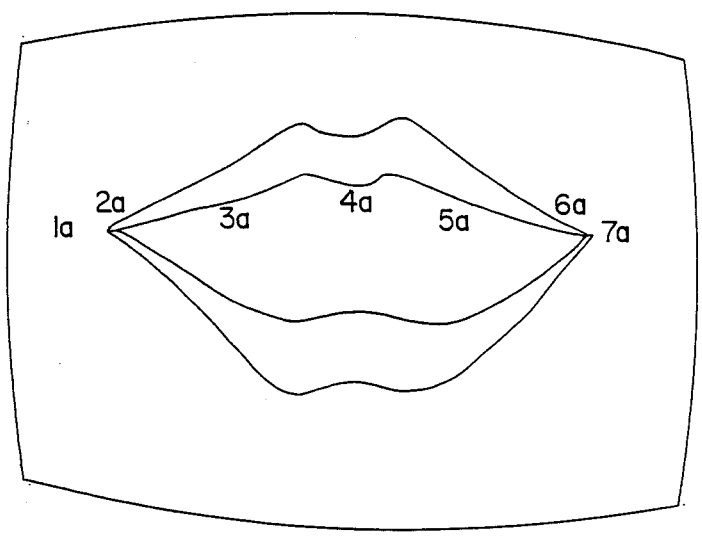
FIG. 8 is an enlarged view similar to FIG. 7 but showing the manner of forming one of the standard curves.

The standard curves are defined by measuring and transcribing the X, Y coordinates of operator-selected control points shown for example in FIG. 8 with respect to the open upper lip curve 94. The same procedure is followed with respect to the other curves. Normally, control points for the lip curves include a blend point at the cheeks 1a, 7a, the corners 2a, 6a the center 4a and one or two points on either side of the center end corner 3a, 5a. Control points for the nose blend and neck blend are arbitrary and normally bound the alteration area. Control points for the jaw curves follow the corresponding lower lip curves.

The operator can measure the X, Y coordinates of the standard curve control points in a manner similar to measuring the head and lip movements earlier described. Thus, the film may be mounted in a telecine arrangement that includes the hardware 42-54. An appropriate frame of the film for standardization is encountered and the operator commands digitizing into the image processor 50 and display on the video monitor 52. The operator commands movement of the cursor 54 and the storage of the point coordinates by striking appropriate keys on the keyboard of the computer 48. Consequently, the X, Y coordinates for each control point is located at an actual X, Y location with reference to the location of the center point (X=0, Y=0) of the mouth. All the data are fed into the computer 48 on a point by point, curve by curve basis. This allows each curve to be located for frame to frame movement in altering the individual frames.

Figure 9:
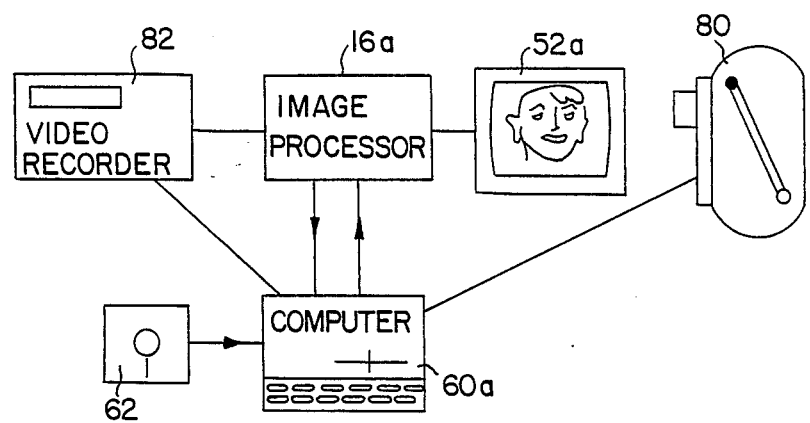
FIG. 9 is a block diagram showing the final steps in correcting the facial display.

With the hereinafter defined algorithms and programming for the computer there is now in the process being described sufficient data for altering the original film to provide a new section of film or video tape to be combined with the new sound that is recorded on the recorder 12. The hardware used may be that shown at 42-54 of FIG. 2 with the addition of a single frame by frame recording camera. Alternatively, the hardware may take the form shown in FIG. 9 in which the film is in video tape form and is being transmitted from a video tape recorder 82 to the image processor 16a. The computer 60a, video monitor 52a and the image processor 16a function as previously described. A recording camera 80 may record on a frame by frame basis the images on the monitor 52a.

The recording camera may be a film camera or a video camera with accompanying video cassette recorder.

As previously described the telecine 42-46 or VCR arrangement 82 under control of the digital computer 60a converts each film frame into a video signal which is digitized, stored and redisplayed by the digital image processor 16a. In addition to digitizing, storing and redisplaying the film frame the digital image processor 16a also sends and receives light intensity information to and from the computer 60a. More particularly, the operation of the image processor 16a and the digital computer 60a are such that the image processor accepts an X, Y coordinate from the computer sends back the numeric value corresponding to the light intensity at that coordinate location. Moreover, the image processor can replace the light intensity at a given coordinate location with a new value sent from the digital computer. Consequently, any particular point at an X, Y location on a working curve of the original lips (FIG. 4) can be made to shift or move to the new location identified by a corresponding point on the new lip form (FIG. 3). Since the foregoing is done with respect to all points on the lip curves the various points on the lip curves in FIG. 4 will be shifted to correspond to the lip curves of FIG. 3 for providing new lip movements to correspond with the new sound. The computer program and the arrangement is such that the amount of shifting is controlled by reference to a pair of standard curves of FIG. 7, more particularly the two standard curves between which the particular X, Y point is located.

As determined by an algorithm uniquely applied to the present process repeated replacements of light intensities are made over the facial area pixels between nose and neck to modify the image so that when redisplayed on the monitor the actors mouth appears to have the shape required by the sound. The modified frame displayed on the monitor 52a is recorded by a camera 80 or recorded directly upon video tape by a video tape recorder. The alteration process is repeated on a frame by frame basis until the entire dialog portion of the film is rerecorded.

The algorithms utilized in the present invention are capable of translation into instructions and then entered, stored and executed by the computer. As previously pointed out, these algorithms combine standard curve information or data with new lip movement data and present head and lip movement data on the film.

The algorithms include (1) interpolating the frame data for movement information, (2) constructing working curves from the standard curves, (3) finding curve intercepts, (4) point by point replacement, and (5) filling in the inner mouth areas.

Frame data for width, height, head movement and X=0, Y=0, (mouth center) are interpolated for movement information. In order to reduce operator effort in connection with previously described measurements, such measurements were made only on frames in which movement changed. Movements for intermediate frames can be interpolated by a straight line or linear interpolation. For example, a frame one-quarter between a closed frame and a full opened (mouth) frame could be assumed to be one-fourth open. However, it has been determined empirically that lip and head movements tend to be non-linear. The interpolation algorithm used herein combines linear and quadratic components. It calculates an intermediate value V, in three equations as follows:

$$A=(F-F1)/(F2-F1)+Q\times(F-F1)\times(F2-F1)/((F2-F1)\times(F2-F1))$$

$$B=(F2-F)/(F2-F1)+Q\times(F2-F)\times(F2-F1)/((F2-F1)\times(F2-F1))$$

$$V=(V2\times A+V1\times B)/(A+B)$$

Where A and B are temporary values used for the third equation, V is the interpolated value (e.g., height, width, head movement) at frame F, V1 the given value at frame F1, V2 the given value at frame F2, and Q an acceleration factor relating to speed of movement and chosen empirically at 0.6. The data interpolated for each frame by these equations includes:

Original (before alteration), upper lip height, lower lip height, inner width, outer width, slope change, and the X, Y coordinates of the mouth center.

Desired new language (after alteration) upper lip height, lower lip height, inner width and outer width.

The heights and widths are combined with standard curves to construct working curves which represent the actual curves for the mouth regions involved.

As previously described, standard curves were defined by the operator for open and closed upper lip, lower lip, and jaw. Working curves approximating the before and after upper lip, lower lip, and jaw are calculated by interpolating corresponding open and closed standard curve control points by the original foreign and desired new language heights and widths. For example, if the desired new language upper height is 0.5 (i.e., 50% open), then each control point of the upper lip would have X, Y coordinates exactly 0.5 (i.e., 50%) between the corresponding control points of the standard open upper lip and the standard closed upper lip. The before and after working curves for lips and jaws supplement the standard curves for the nose blend, centerline, and neck blend shown in FIG. 7.

Although working and standard curves are defined by a limited number of control points, intermediate points or intercepts between control points can be calculated by interpolation. Although a linear interpolation gives a fair approximation, empirically we have determined that a so called cubic spline interpolation gives a closer approximation to normal lips curves. Cubic spline interpolation is a standard mathematical technique detailed in, for example, Applied Numerical Analysis, 1980, pages 474–488, Addison Wesley Publishing Co., Reading, Mass, U.S.A. Cubic spline interpolation equations are hereinafter shown in the computer program included as part of this specification and appearing under the heading CALCULATE CUBIC COEFF'S. The curve intercepts determined by cubic interpolation are used to find vertical coordinates for point by point replacement.

Point by point replacement is the central algorithm in alteration. All facial points between the nose and neck blend curves are considered for replacement. The point by point replacement is made in FIG. 9 by a digital computer 60a commanding a digital image processor 16a to send intensity information to the digital computer from source coordinates X', Y' and to receive back that value as the new intensity information for a destination point at coordinates X, Y. The major task in the algorithm is the calculation of each destination point X, Y considered for replacement and from that, the calculation of the source point coordinates, X', Y', for intensity information.

One way to calculate the destination coordinate values for x is to start with X=0 at the center of the mouth. Then set X=−1, X=−2, X=−3, . . . until X=the X of the first nose blend point. Then set X=+1, X=+2, X=+3, . . . until X=the X of the last nose blend point. This gives all possible values of X for replacement. Then for each X calculate Y values between Y1 and Y2 as follows: The starting Y1 ordinate can be calculated as the cubic spline Y intercept of X with the nose blend curve. The ending value Y2 can be calculated as the cubic spline Y intercept of X with the neck blend curve. Intermediate values of Y can be calculated by successively subtracting one, Y=nose intercept, nose intercept −1, nose intercept −2 . . . until Y intercepts the neck blend. To calculate the source vertical ordinate, Y1', calculate Y1,Y2,Y1' and Y2' as follows: Calculate Y1 as the Y intercept of the blend or working "after" curve above Y; Y2 as the Y intercept of the blend or working "after" curve below Y; Y1 as the intercept of the blend or "before" curve corresponding to Y1; and Y2' as the intercept of the blend or working "before" curve corresponding to Y2.

Next calculate the Y' coordinate between Y1' and Y2' by linear interpolation:

$$Y'=Y+((Y1-Y1')\times(Y-Y2)+(Y2-Y2')\times(Y-Y1))/(Y2-Y1)$$

The calculation of the source horizontal coordinate, X', depends on the X and Y coordinates of the destination point and the widths of the mouth before and after alteration.

(1) Calculate XW, the width adjusted X between the upper and lower lips as follows:
(a) If X is between X0, the cheek, and X1 the corner of the mouth calculate XW a width factor from W0, the outer "after" width and W0', the outer "before" width as:

$$XW=X1\times(X-X0)\times(W0'-W0)/(X1-X0)$$

(b) If X is between X1 the corner of the mouth and 0, the center, calculate XW' from W1, the inner "after" width and W1' the inner "before" width as:

$$XW = (X - X0) \times (W1' - W1)$$

(2) If Y is between the upper and lower lip curves use XW the width adjusted X for the source X coordinate, X' directly:

$$X' = X + XW$$

(3) If Y is between Y1, the upper nose blend intercept and Y2 the upper lip intercept, interpolate XW by the distance above the upper lip curve:

$$X' = X + XW \times (Y1 - Y)/(Y1 - Y2)$$

(4) If Y is between Y4 the lower lip intercept and Y5 the jaw intercept, interpolate XW by the distance below the lower lip curve:

$$X' = X + XW \times (Y - Y5)/(Y4 - Y5)$$

(5) If Y is between the jaw and the neck use no width adjustment:

$$X' = X$$

To recapitulate: the intensity of every point in the lower face is replaced by the intensity from another point based on: (a) the X,Y coordinates of the point to be replaced, (b) the standard blend curves, (c) working curves based on the before and after heights, and horizontal adjustment from before and after widths.

The difference between the replaced point X,Y and source X', Y' is decreased to zero at the blend curves at the nose, center and neck as well as blend points in the cheeks. This gradual decrease to zero results in an invisible seam between change and unchanged areas of the face.

The order in which points are replaced is arbitrary. However, data storage requirements in the computer are reduced if lips are stretched and widened toward the center, shrunk and pursed from the center.

When a mouth is stretched from closed to open, points within the mouth may need intensity information from a previous frame. For instance, tooth configurations may need to be restored. Intensity information from a range of points from a digitized full open mouth are sent from the digital image processor 16a to and stored in the host computer 60a memory. When a subsequent frame is digitized the host computer can send some of the point intensities, as determined by the program, for replacement at corresponding locations in the newly opened mouth. Such corresponding locations are calculated by referring all points to the center of the mouth. Transfer is limited to operator-specified left and right maximum distances from center. Only points between the "after" or new language upper and lower lip curves are replaced.

After all frames in a sequence are digitized, altered, and recorded on film or video tape, the altered graphic frames may be combined with the new language sound from recorder to complete the section of film. The combining may be carried out, for example, by conventional techniques for adding a sound track to a film The computer programs for carrying out the invention can be found in Patent Number 4,600,281 which is incorporated herein by reference.

```
10 REM   (C)   1985, R.W.BLOUMSTEIN - HIGHLAND PARK, IL. 60035
20 REM
30 REM-----------------------------------------------
40 REM
50 REM      A L T E R S   L I P S,  M O U T H   ETC.
60 REM
70 REM-----------------------------------------------
80 REM
90 REM      C U R V E   T A B L E S
100 REM         NOTE, J=TOTAL,K=ACTIVE,H=MAX POINTS PER
110 REM
120 J=17\K=9\H=9 \ REM    MAY BE INCREASED LATER.
130 DIM A8(H,K),B8(H,K),C8(H,K),D8(H),E8(H),O8(K)
140 DIM H8(J),X8(H,J),Y8(H,J)
150 REM-----------------------------------------------
160 REM      O P T I O N S   A N D   W I D T H   A D J U S T
170 REM
180 DIM K6(16),W2(8)
190 W2(1)=1 \ W2(2)=1
200 REM-----------------------------------------------
210 REM      S E R I E S   T A B L E S   NOTE, L0=MAX NUMBER
220 L0=12
230 DIM L1(L0),M1(L0),P1(L0),Q1(L0),R1(L0),S1(L0)
240 DIM L8(L0),S8(L0),T8(L0)
250 FOR J=1TOL0 \S8(J)=1.0 \NEXTJ
260 L8(3)=1 \ L8(4)=1 \ L8(7)=1 \ L8(8)=1 \ L8(11)=1
270 L4=1\H4=2\N4=3\L5=4\M5=5\N5=6
280 L7=4\M7=5\L3=6\M3=7\N3=9\J1=10\I1=14
290 REM-----------------------------------------------
```

```
300 O4=1 \ F0=1 \ O6=24096
310 REM--------------------------------------
320 REM
330 REM    R E A D   T R A N S A C T I O N   F I L E
340 REM
350 INPUT " FRAME START,STOP,TRANFILE? ", O7,F8,T$
360 IF O7 < 0 THEN END
370 OPEN #1,T$
380 IF TYP(1)=0 THEN 460 ELSE READ#1,I0
390 IFI0=0 THEN 460
400 ON 1+(I0-1)/5 GOTO 410,420,430,440
410 ON I0 GOTO 610,700,740,780,830
420 ON I0-5 GOTO 870,930,1000,1080,1130
430 ON I0-10 GOTO 1200,1250,1310,1360,1390
440 ON I0-15 GOTO 1460,1490,1520,1540
450 STOP
460 PRINT "END OF FILE " \ CLOSE #1
470 IF K6(5)=0 THEN 350
480   INPUT1 "CURVE #? ",J \IF J=0 THEN 350
490   PRINT N8(J),
500   FOR N=1TON8(J)\PRINT X8(N,J),Y8(N,J), \NEXTN
510 PRINT \ GOTO480
520 REM-------------------------------------
530 REM    P R O C E S S   B Y   T R A N   C O D E
540 REM
550 REM 1 = S E R I E S
560 REM - CODES ARE 1=FRAMEIN,2=FRAMEOUT,3=OLDHITE (0..1),
570 REM -  4=OLDWIDE,5=NEWHITE,6=NEWWIDE,7=XCENT,8=YCENT,
580 REM -  11=SLOPE.
590 REM - FIELDS ARE L1=1STFRAME,M1=NUM-1,P1=STARTVALUE,
600 REM -  Q1=ENDVALUE,R1=ACCEL (0..1)
610 READ #1,J,L1(J),M1(J),P1(J),Q1(J),R1(J)
620 S1(J)=P1(J)
630 GOTO380
640 REM 2 = C U R V E
650 REM - CURVES ARE 8=NOSE,9=NECK,10=OPENUPPER,
660 REM -  11=OPENLOWER,12=OPENJAW,13=OPENCENTER,
670 REM -  14=CLOSEUPPER,15=CLOSELOWER,16=CLOSEJAW,
680 REM -  17=CLOSECENTER
690 REM - FIELDS ARE J=CURVENUM,N8(J),X8(1,J),...Y8(N,J)
700 READ #1,J,N8(J)
710 FOR N=1TO N8(J)\ READ #1,X8(N,J),Y8(N,J) \NEXTN
720 GOTO380
730 REM 3 = W 2   A D J U S T
740 READ #1,N
750 FOR J=1TON \READ #1,W2(J)\ NEXTJ
760 GOTO380
770 REM 4 = M A N U A L
780 READ #1,I,A,B,C
790 PRINT "MANUAL STOP ",I,A,B,C
800 STOP
810 GOTO380
820 REM 5 = F R A M E   O F F S E T S
830 READ #1,F9,P9,Q9,R9
840 FOR J=1 TO L0 \ M1(J)=0 \ NEXT J
```

```
850 GOTO380
860 REM 6 = R E A D   F R A M E
870 READ #1,S1(1) \ GOSUB880 \ GOTO380
880 PRINT "LOAD  FROM ",INT(S1(1)+F8+.1)
890 STOP \ REM READ FRAME
900 GOSUB 2110
910 RETURN
920 REM 7 = W R I T E   F R A M E
930 READ #1,S1(2) \ GOSUB 940 \ GOTO380
940 PRINT "WRITE TO ",INT(S1(2)+F8+.1)
950 STOP \REM WRITE FRAME
960 RETURN
970 REM 8 = S T O R E   P R O T O T Y P E
980 REM - FIELDS ARE J=1,P7=SLOPE,A7=PIXEL.DIST.ABOVE.CENT.
990 REM -  B7=BELOW,C7=LEFT,D7=RITE,X7=XCENTER,Y7=YCENTER
1000 READ #1,J,P7,A7,B7,C7,D7,X7,Y7
1010 GOSUB 4730
1020 STOP
1030 GOTO380
1040 REM 9 = D O  F 1  M A N Y  F R A M E S
1050 REM - FIELD IS NUMBER OF FRAMES TO DO.
1060 REM - SHOULD FOLLOW TRAN CODES 2'S,8,10'S,
1070 REM -    11,12,13 AND 1'S OR 14,15
1080 READ #1,F1
1090 GOTO 1590
1100 REM 10 = O P T I O N  N U M B E R, V A L U E
1110 REM - FIELDS ARE J=OPTION.NUM,K6(J)=OPTION.VALUE.
1120 REM - USE K6(2)=NUMBER OF TIMES TO FILL WITH PROTOTYPE.
1130 READ #1,J,K
1140 IF J=0 THEN L6=K ELSE K6(J)=K
1150 GOTO380
1160 REM 11 = W I N D O W  D I M E N S I O N S
1170 REM - FIELDS ARE A6=MAX.PIXEL.DIST.ABOVE.CENTER,
1180 REM -  B6=BELOW,C6=LEFT,D6=RITE. NO CURVE POINT
1190 REM -   SHOULD LIE OUTSIDE.
1200 READ #1,A6,B6,C6,D6
1210 GOTO380
1220 REM 12 = S T A N D A R D  W I D T H S
1230 REM - FIELDS ARE C1=PIXEL.DIST.LEFT.PURSE,
1240 REM -  D1=RITE.PURSE,C2=LEFT.NORMAL,D2=RITE.NORMAL
1250 READ #1,C1,D1,C2,D2
1260 GOTO380
1270 REM 13 = S P E C I A L  A D J U S T S
1280 REM - FIELDS ARE E7=PIXEL.DIST.LEFT.FILL,F7=RITE,
1290 REM -  V5=LEFT.PURSE.Y.COORD OR 0,W5=RITE OR 0.
1300 REM -  E7,F7 SHOULD NOT EXCEED C7,D7.
1310 READ #1,E7,F7,V5,W5
1320 GOTO380
1330 REM 14 = N E W  H E I G H T,  W I D T H
1340 REM - FIELDS ARE ENGLISH HITE,WIDTH 0...1
1350 REM -  USE INSTEAD OF SERIES 5 AND 6.
1360 READ #1,S1(5),S1(6)
1370 GOTO380
1380 REM 15 = O L D  H E I G H T, W I D T H, C E N T E R
1390 READ #1,S1(3),S1(4),S1(7),S1(8)
```

```
1400 REM - FIELDS ARE FOREIGN HITE,WIDE (0..1),
1410 REM -   XCENTER,YCENTER (SCREEN COORDINATE).
1420 REM -   USE INSTEAD OF SERIES 3,4,7,8.
1430 X6=S1(7) \ Y6=S1(8)
1440 GOTO380
1450 REM 16 = R E D E F I N E   C U R V E   U S E S
1460 READ #1,L4,M4,N4,L5,M5,N5,L7,M7,L3,M3,N3,J1,I1
1470 GOTO380
1480 REM 17 = R E A S S I G N   S T D.   C U R V E S
1490 READ #1,J1,I1,R6
1500 GOTO380
1510 REM 19 = T U N E
1520 READ #1,J,L8(J),S8(J),T8(J) \GOTO380
1530 REM 19 = S I N G L E   H E I G H T,  W I D T H   ETC,
1540 READ #1,J,S1(J) \ L1(J)=0 \ M1(J)=0 \GOTO380
1550 REM----------------------------------------
1560 REM
1570 REM    B E G I N   D O I N G   F1   F R A M E S
1580 REM
1590 IFL6>0THENPRINT "STARTING FRAME ",F0,F1
1600 IFF0>=0THEN1610\K6(2)=0\GOTO2270
1610 IF K6(7) < 1 THEN 1660
1620 REM   O N   K6(7)   R E U S E   B U F F E R
1630 S1(3)=S1(5)\S1(4)=S1(6)
1640 S1(7)=S1(7)+S1(9)\S1(8)=S1(8)+S1(10)
1650 REM   E X P A N D   S E R I E S   1 ... L0
1660 IFL6THENPRINT "START SERIES FOR FRAME ",F0
1670 FOR L=1 TO L0
1680 IF M1(L)=0 THEN 1770
1690 IF L8(L)=0 THEN F=F0 ELSE F=S1(L8(L))
1700 F=(F-L1(L))/M1(L)
1710 IF (F<0.0 OR F>1.0) THEN 1770
1720 G=1-F
1730 F=P1(L)*F*(F-1)+F
1740 G=R1(L)*G*(G-1)+G
1750 S1(L)=(F*Q1(L)+G*P1(L))/(F+G)
1760 IFL6THENPRINT "SERIES ",L,S1(L),F,G
1770 NEXTL
1780 X6=INT(S1(7)*S8(7)+T8(7)) \ Y6=INT(S1(8)*S8(8)+T8(8))
1790 IFL6THENPRINT "CENTER ",X6,Y6
1800 REM
1810 REM   C A L C   B E F O R E   A N D   A F T E R   C U R V E S
1820 IF K6(8)>0 THEN 1860
1830 H1=S1(3)*S8(3)+T8(3) \ W1=S1(4)*S8(4)+T8(4)
1840 N1=3\K1=L4\GOSUB 2380
1850 C4=C\D4=D
1860 IF K6(9)>0 THEN 1910
1870 H1=S1(5)*S8(5)+T8(5) \ W1=S1(6)*S8(6)+T8(6)
1880 N1=4\K1=L5\GOSUB 2380
1890 C5=C\D5=D
1900 REM   S P E C I A L   O P T I O N S
1910 IF K6(12)>0 THEN 2190
1920 IF K6(7)=0 THEN 1950
1930 K6(7)=K6(7)-1 \ GOTO 1990
1940 REM   N O R M A L   P R O C E S S,  R E A D   F R A M E
```

```
1950 IF K6(10)>0 THEN 1990
1960 GOSUB 880
1970 GOSUB 2110
1980 REM   C A L C U L A T E   S P L I N E   C O E F F ' S
1990 FOR J=L4 TO N3
2000 N=N8(J) \ K=J \ GOSUB 4080 \ REM-CALC SPLINE COEFF'S
2010 IFL6<2THEN 2060
2020    PRINT "X,Y,A,B,C FOR CURVE ",J
2030    FOR N=1 TO N8(J)
2040       PRINT X8(N,J),Y8(N,J),A8(N,J),B8(N,J),C8(N,J)
2050    NEXTN
2060 NEXTJ
2070 IF K6(5)>2 THEN 2190
2080 IFK6(5)THENGOSUB4480
2090 REM   S T R E T C H ,   F I L L ,   B L E N D
2100 GOSUB 2530
2110 GOSUB 2660
2120 IFK6(5)THENGOSUB4480
2130 IF K6(2) < 1 THEN 2160
2140 K6(2)=K6(2)-1
2150 GOSUB 4540
2160 GOSUB 3420
2170 GOSUB 3510
2180 IFK6(5)THENGOSUB4480
2190 IFK6(11)THEN2280
2200 IF(S1(9)=0 AND S1(10)=0) THEN 2230
2210 PRINT "SHIFT FRAME BUFFER ",INT(S1(9)),INT(S1(10))
2220 REM   W R I T E   O U T   A N D   C O N T I N U E
2230 GOSUB 940
2240 REM------------------------------
2250 STOP \REM WRITE OUT
2260 REM------------------------------
2270 S1(2)=S1(2)+1.0
2280 IF F0<F9 THEN 2310
2290 PRINT "** OPERATOR SELECTED STOP AFTER ",F0
2300 INPUT "ENTER NEXT STOP ",F9
2310 F0=F0+1.0 \ F1 = F1-1.0
2320 IF F1 < 1.0 THEN 380
2330 GOTO 1590
2340 REM------------------------------
2350 RETURN \REM INITIALIZE FRAME BUFFER
2360 REM------------------------------
2370 REM   B E F O R E   A N D   A F T E R   FROM H1,W1,C1..D2
2380 C=W1*C2+(1-W1)*C1 \ D=W1*D2+(1-W1)*D1
2390 IFL6THENPRINT"CREATE: ",K1,H1,W1,C,D,(C+D)/(C2+D2)
2400 FOR J=0 TO N1-1
2410 W=1-W2(J+1)+W2(J+1)*(C+D)/(C2+D2)
2420 N8(K1+J)=N8(J1+J)
2430 FOR N=1 TO N8(K1+J)
2440 X=W*((1-H1)*X8(N,I1+J)+H1*X8(N,J1+J))
2450 Y=(1-H1)*Y8(N,I1+J)+H1*Y8(N,J1+J)
2460 X8(N,K1+J)=X*(1-S1(11))+Y*S1(11)
2470 Y8(N,K1+J)=Y*(1-S1(11))+X*S1(11)
2480 IFL6THENPRINT J,N,X8(N,K1+J),Y8(N,K1+J)
2490 NEXTN \ NEXTJ
2500 RETURN
```

```
2510REM----------------------------------------
2520 REM   L E F T   S I D E   U P P E R  &  L O W E R
2530 E4=(C4-C5)/C5 \ G4=C6
2540 I4=04\ I5=INT(C6-C5) \ I6=INT(C6)
2550 IF C5>=C4 THEN 2570
2560 I4=-04\ I5=INT(C6) \ I6=INT(C6-C5)
2570 S4=C4/C5
2580 R5=V8(1,L5)-V8(1,L4)
2590 IFL6THENPRINT"LEFT",E4,G4,I4,I5,I6,S4,R5
2600 IF R5>=0 THEN GOSUB 2790
2610 GOSUB 3150
2620 IF R5<0 THEN GOSUB 2790
2630 RETURN
2640REM----------------------------------------
2650 REM  R I G H T   S I D E   U P P E R  &  L O W E R
2660 E4=(D4-D5)/D5 \ G4=C6
2670 I4=-04\ I5=INT(C6+D5) \ I6=INT(C6+04)
2680 IF D5>=D4 THEN 2700
2690 I4=04\ I5=INT(C6+04) \ I6=INT(C6+D5)
2700 S4=D4/D5
2710 R5=V8(N8(L5),L5)-V8(N8(L4),L4)
2720 IFL6THENPRINT"RITE",E4,G4,I4,I5,I6,S4,R5
2730 IF R5>=0 THEN GOSUB 2790
2740 GOSUB 3150
2750 IF R5<0 THEN GOSUB 2790
2760 RETURN
2770REM----------------------------------------
2780 REM   L O W E R   R E G I O N
2790 FOR I=I5 TO I6 STEP I4
2800 J=N4\K=N4\X=I-C6\ GOSUB 4370 \ V2=V
2810 J=N5\K=N5\X=I-C6\ GOSUB 4370 \ V3=V
2820 J=N4\K=N4\X=(I-C6)*S4\ GOSUB 4370 \ V4=V
2830 J=N5\K=N5\X=I-C6\ GOSUB 4370 \ V5=V
2840 J=N3\K=N3\X=I-C6\ GOSUB 4370 \ V0=V
2850 V0=V0+A6
2860 V2=V2+A6\V3=V3+A6\V4=V4+A6\V5=V5+A6
2870 S5=(I-G4)*E4 \ T5=V4-V5
2880 IF V5+V3<=V4+V2 THEN 3010
2890 REM   P R O C E S S   F R O M   J A W   T O   L I P
2900 J=N7\K=N7\X=I-C6\ GOSUB 4370 \ V1=V+A6
2910 J4=-1 \ J5=INT(V3) \ J6=INT(V1) \REM STRETCH JAW TO LOLIP
2920 E5=0 \ G5=S5/(J5-J6)
2930 F5=V2-V3 \ H5=(T5-F5)/(J5-J6)
2940 GOSUB 3820
2950 J4=-1 \ J5=INT(V1)-1 \ J6=INT(V0) \REM LOLIP TO CENTER
2960 IF J5<=J6 THEN 2980
2970 G5=0 \ H5=-F5/(J5-J6) \ GOSUB 3820
2980 NEXTI
2990 RETURN
3000 REM   P R O C E S S   F R O M   L I P   T O   J A W
3020 E5=S5 \ G5=S5/(J5-J6)
3030 F5=T5 \ H5=(F5-V2+V3)/(J5-J6)
3040 GOSUB 3820
3050 J=N3\K=N3\X=I-C6\ GOSUB 4370 \ V1=V+A6
```

```
3060 J4=1 \ J5=INT(V3)+1 \ J6=INT(V1)
3070 E5=0 \ G5=0
3080 IF J5>=J6 THEN 3110
3090 F5=V2-V3 \ H5=F5/(J5-J6)
3100 GOSUB 3820
3110 NEXTI
3120 RETURN
3130REM--------------------------------------------------
3140 REM   U P P E R   L I P   R E G I O N
3150 FOR I=I5 TO I6 STEP J4
3160 J=L5\K=L5\X=I-C6\ GOSUB 4370 \ V5=V
3170 J=L4\K=L4\X=(I-C6)*S4\ GOSUB 4370 \ V4=V
3180 J=L3\K=L3\X=I-C6\ GOSUB 4370 \ V1=V
3190 J=M3\K=M3\X=I-C6\ GOSUB 4370 \ V0=V
3200 V0=V0+A6
3210 V5=V5+A6\V4=V4+A6\V1=V1+A6
3220 S5=(I-G4)*E4 \ T5=V4-V5
3230 IF V5>V4 THEN 3330
3240 REM   N O S E   T O   L I P
3250 J4=1 \ J5=INT(V1) \ J6=INT(V0)
3260 IF J6-J5 = 0 THEN 3300
3270 E5=0 \ G5=S5/(J6-J5)
3280 F5=0 \ H5=T5/(J6-J5)
3290 GOSUB 3820
3300 NEXTI
3310 RETURN
3320 REM   L I P   T O   N O S E
3330 J4=-1 \ J5=INT(V0) \ J6=INT(V1)
3340 IF J6-J5 = 0 THEN 3380
3350 E5=S5 \ G5=S5/(J6-J5)
3360 F5=T5 \ H5=T5/(J6-J5)
3370 GOSUB 3820
3380 NEXTI
3390 RETURN
3400REM--------------------------------------------------
3410 REM   B L E N D   O U T E R   A F T E R   P U R S E
3420 IF C5>=C4 THEN RETURN
3430 E4=(C4-C5)/(C6-C5) \ G4=0
3440 I4=-O4\ I5=INT(C6-C5-1) \ I6=1
3450 S4=C4/C5
3460 IFL6THENPRINT"OUTLEFT",E4,G4,I4,I5,I6,S4
3470 J5=INT(V5+A6)
3480 GOSUB 3610
3490 GOSUB 3710
3500 RETURN
3510 IF D5>=D4 THEN RETURN
3520 E4=(D4-D5)/(D6-D5) \ G4=C6+D6
3530 I4=O4\ I5=INT(C6+D5+O4) \ I6=INT(C6+D6)
3540 S4=D4/D5
3550 IFL6THENPRINT"OUTRITE",E4,G4,I4,I5,I6,S4
3560 J5=INT(W5+A6)
3570 GOSUB 3610
3580 GOSUB 3710
3590 RETURN
3600 REM   L O W E R   B L E N D
```

```
3610 J4=1
3620 FOR I=I5 TO I6 STEP I4
3630 J=N3\K=N3\X=I-C6\ GOSUB 4370
3640 J6=INT(Y+A6)
3650 E5=(G4-I)*E4 \ G5=E5/(J5-J6)
3660 F5=0 \ H5=0
3670 GOSUB 3820
3680 NEXTI
3690 RETURN
3700 REM   U P P E R   B L E N D
3710 J4=-1
3720 FOR I=I5 TO I6 STEP I4
3730 J=L3\K=L3\X=I-C6\ GOSUB 4370
3740 J6=INT(Y+A6)
3750 E5=(G4-I)*E4 \ G5=E5/(J6-J5)
3760 F5=0 \ H5=0
3770 GOSUB 3820
3780 NEXTI
3790 RETURN
3800REM--------------------------------------------
3810 REM   M O V E   P I X E L S   I N   C O L U M N = I
3820 IFL6THENPRINT I,%7F3,E5,G5,F5,H5,%#,J4,J5,J6
3830 REM J5 IS STARTING ROW, J6 END,  J4=+1 OR -1
3840 IF K6(5)>1 THEN RETURN
3850 IF ABS(G5*(J5-J6))<1 THEN G5=0
3860 IF ABS(H5*(J5-J6))<1 THEN H5=0
3870 IF SGN(E5)<>SGN(I4) THEN E5=0
3880 IF SGN(G5)<>SGN(I4) THEN G5=0
3890 FOR J=J5 TO J6 STEP J4
3900 Y=INT(J+F5+.5+Y6-A6)
3910 X=INT(I+E5+0.5+X6-C6-(Y-Y6)*R6)
3920 Z=CALL(O6,Y)+CALL(O6+3,X) \ REM **** GET PIXEL AT X,Y
3930 Z=CALL(O6+6) \ REM **** Z=PIXEL VALUE
3940 Y=INT(J+Y6-A6+.1)
3950 X=INT(I+X6-C6-(Y-Y6)*R6+.1)
3960 W=CALL(O6,Y)+CALL(O6+3,X) \ REM **** PUT PIXEL AT X,Y
3970 W=CALL(O6+9,Z) \ REM **** PIXEL = Z
3980 E5=E5+G5 \ F5=F5+H5
3990 NEXTJ
4000 RETURN
4010REM--------------------------------------------
4020 REM    C A L C U L A T E   C U B I C   C O E F F'S
4030 REM
4040 REM   CALLER POINTS TO CURVE J ...X8(,),Y8(,)
4050 REM   ROUTINE RETURNS COEFFS K ...A8(,K),B8(,K),C8(,K)
4060 REM    A8() IS FOR X^3, B8() FOR X^2 AND C8() FOR X
4070 REM
4080 O=X8(2,J)-X8(1,J)
4090 P=(Y8(2,J)-Y8(1,J))/O*6
4100 FOR I=1 TO N-2
4110 Q=X8(I+2,J)-X8(I+1,J)
4120 R=(Y8(I+2,J)-Y8(I+1,J))/Q*6
4130 A8(I,K)=O\B8(I,K)=2*(O+Q)\C8(I,K)=Q
4140 D8(I)=R-P\O=Q\P=R
```

```
4150 NEXT I
4160 FOR I=2 TO N-2
4170 B8(I,K)=B8(I,K)-A8(I,K)/B8(I-1,K)*C8(I-1,K)
4180 D8(I)=D8(I)-A8(I,K)/B8(I-1,K)*D8(I-1)
4190 NEXT I
4200 D8(N-2)=D8(N-2)/B8(N-2,K)
4210 FOR I=2 TO N-2
4220 L=N-1-I
4230 D8(L)=(D8(L)-C8(L,K)*D8(L+1))/B8(L,K)
4240 NEXT I
4250 FOR I=1TON-2\E8(I+1)=D8(I)\NEXT I
4260 E8(1)=0\E8(N)=0
4270 FOR I=1 TO N-1
4280 A8(I,K)=(E8(I+1)-E8(I))/(6*(X8(I+1,J)-X8(I,J)))
4290 B8(I,K)=E8(I)/2
4300 O=X8(I+1,J)-X8(I,J)\P=Y8(I+1,J)-Y8(I,J)
4310 C8(I,K)=P/O-(2*O*E8(I)+O*E8(I+1))/6
4320 NEXT I
4330 RETURN
4340REM-----------------------------------------------
4350 REM   Y = INTERP OF X,X8..Y8(N,J),A8..B8..C8(N,K)
4360 REM  CALLER SETS J,K,X. ROUTINE RETURNS Y.
4370 N=N8(J) \ Y=Y8(N,J) \ L=O8(J)
4380 IF X>=X8(L,J) AND X<X8(L+1,J) THEN 4430
4390 IF X>=X8(N,J) THEN RETURN
4400 L=0
4410 L=L+1 \ IF X>=X8(L+1,J) THEN 4410
4420 O8(J)=L
4430 U=X-X8(L,J)
4440 Y=U*(U*(A8(L,K)*U+B8(L,K))+C8(L,K))+Y8(L,J)
4450 RETURN
4460REM-----------------------------------------------
4470 REM  S T R I C T L Y   D E B U G G I N G
4480 RETURN
4490REM-----------------------------------------------
4500 REM  S T R I C T L Y   D E B U G G I N G
4510 RETURN
4520REM-----------------------------------------------
4530 REM  F I L L   F R O M   P R O T O T Y P E
4540 OPEN#2,"PROTO" \READ #2, A7,B7,C7,D7,R7,X7,Y7
4550 IFL6THENPRINT "FILL ",A7,B7,C7,D7,R7,X7,Y7
4560 FOR J7=1 TO A7+B7 \ READ #2,&Z\ NEXT J7
4570 NEXT I7
4580 FOR I=C6-E7 TO C6+F7
4590 J=L7\K=L7\X=I-C6\ GOSUB 4370 \ Y0=Y
4600 J=M7\K=M7\X=I-C6\ GOSUB 4370 \ Y1=Y
4610 Y0=INT(Y0) \ Y1=INT(Y1)
4620 FOR J7=1 TO A7+Y0 \ READ #2,&Z\ NEXTJ7
4630 FOR J=A6+Y0 TO A6+Y1 STEP 1
4640 Y=INT(Y6-A6+J)
4650 READ #2,&Z7
4660 X=INT(X6-C6+I-(Y-Y6)*R6)
4670 Z=CALL(O6,Y)+CALL(O6+3,X) \ REM **** PUT PIXEL X,Y
4680 Z=CALL(O6+9,Z7) \ REM **** PIXEL=Z7
4690 NEXTJ
```

```
4700 FOR J7=1 TO B7-Y1-1 \ READ #2,&Z \ NEXTJ7
4710 NEXTI \ CLOSE#2 \ RETURN
4720 REM---------- STORE PROTOTYPE ON DISK ------------
4730 OPEN #2,"PROTO"
4740 WRITE #2,A7,B7,C7,D7,R7,X7,Y7
4750 FOR I=1 TO INT(C7+D7) \ REM EACH COLUMN
4760 FOR J=1 TO INT(A7+B7) \ REM EACH PIXEL IN COLUMN
4770 Y=INT(Y7-A7+J) \ X=INT(X7-C7+I+(Y-Y7)*R7)
4780 Z=CALL(O6,Y)+CALL(O6+3,X) \ Z=CALL(O6+6) \REM GET PIXEL XY
4790 WRITE #2,&Z
4800 NEXTJ \ NEXTI
4810 CLOSE #2
4820 RETURN
READY
```

The invention is claimed as follows:

1. A cinematic work having an altered facial display made in accordance with a process that includes substituting a second animated facial display for a first animated display and in which the displays have lip movements corresponding to the languages used and wherein the languages of the two displays are sufficiently different to result in different lip movements for each display, and which process further comprises: generating data in digital form representing the configuration of the second facial display over a plurality of cinematic frames, generating data in digital form representing the configuration of the first facial display over a plurality of cinematic frames of said work, and altering under the control of both sets of said data and a programmed digital computer which provides numerical interpolation of lip distance data, the configuration of said first facial display to produce substantially the configuration of the second facial display.

2. A cinematic work in which a second language and associated lip movements are substituted for a first language and associated lip movements in a cinematic work made up of a number of frames and wherein the two languages have different lip movements, made in accordance with a process including generating data in digital form representing the lip movements of the respective languages, graphically interpolating lip distance between control data, transmitting said data to a programmed digital computer, and under control of said computer, and in accordance with said data, providing modified light intensities at selected areas of the frames to alter the lip movements of the first language to a configuration substantially corresponding to the lip movements of said second language.

3. A cinematic work according to claim 2 in which the selected areas are constituted of video pixels having numerically represented intensities and location, the values of which are stored in the computer, and said modifying includes producing changed numerically defined intensities of selected pixels.

* * * * *